Figure 8:
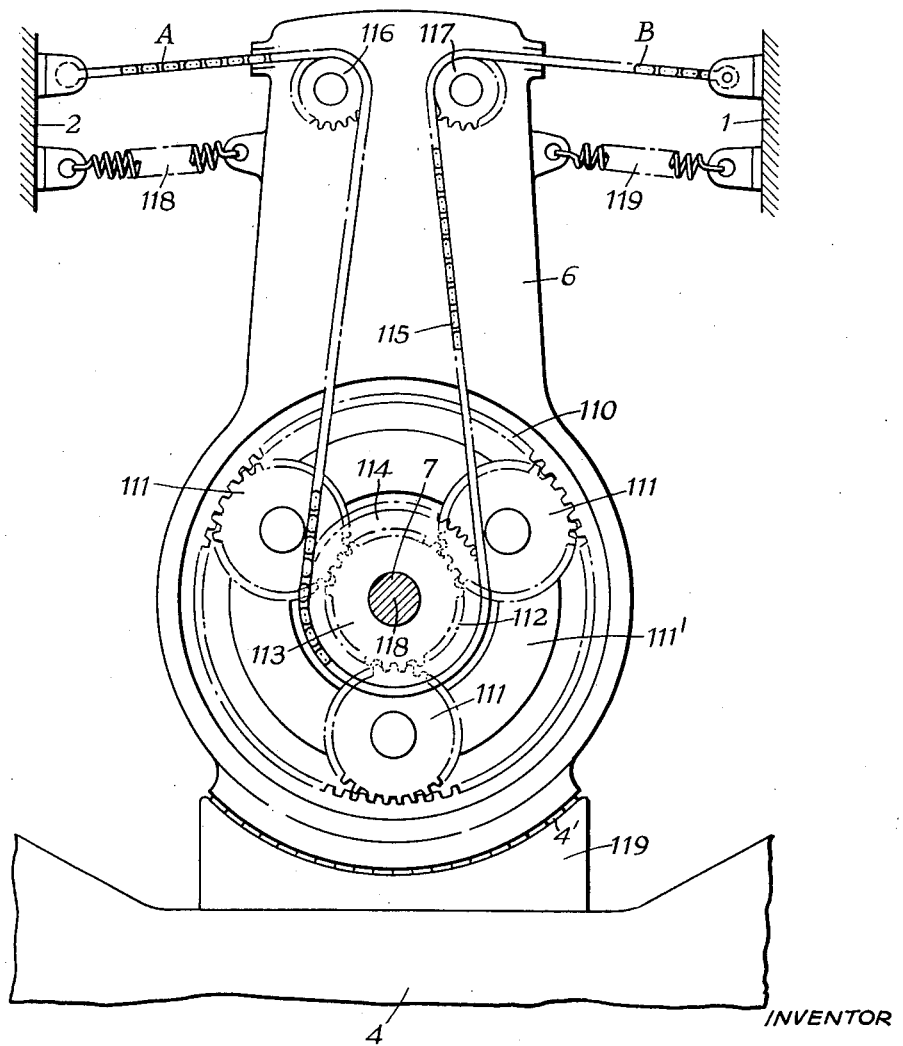

June 5, 1962 R. C. CLERK 3,037,574
VEHICLE DRIVING SYSTEMS
Original Filed Sept. 14, 1953 8 Sheets-Sheet 1
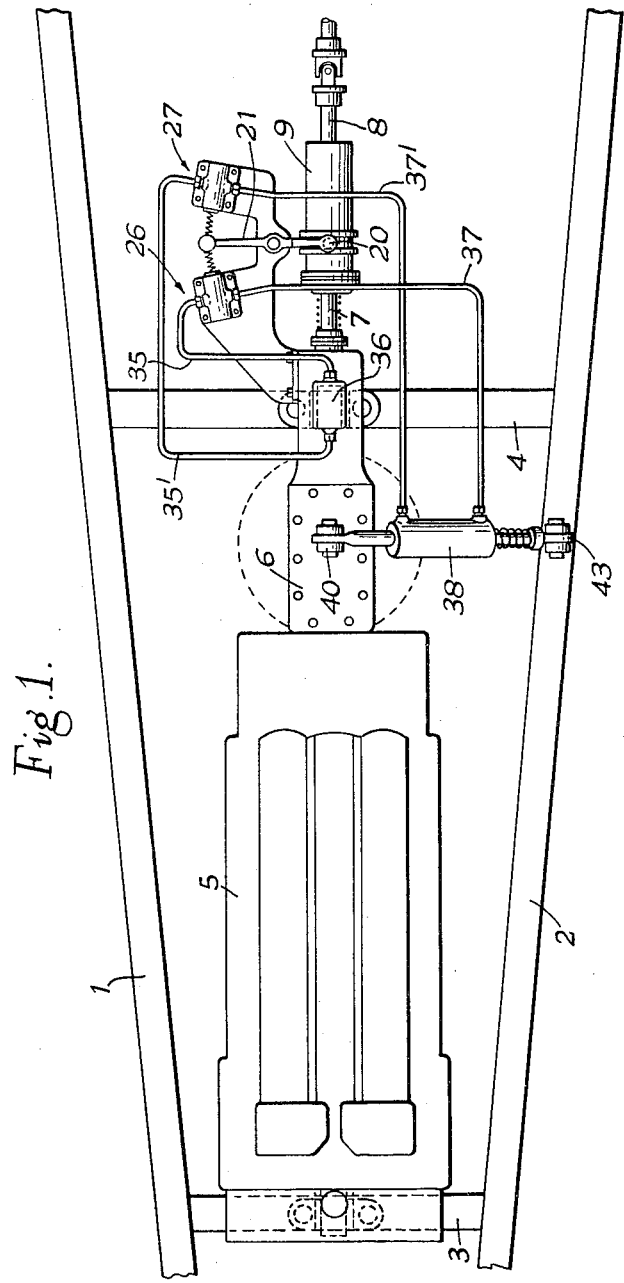
INVENTOR
R. C. CLERK
BY
Joseph N. Schofield
ATTORNEY

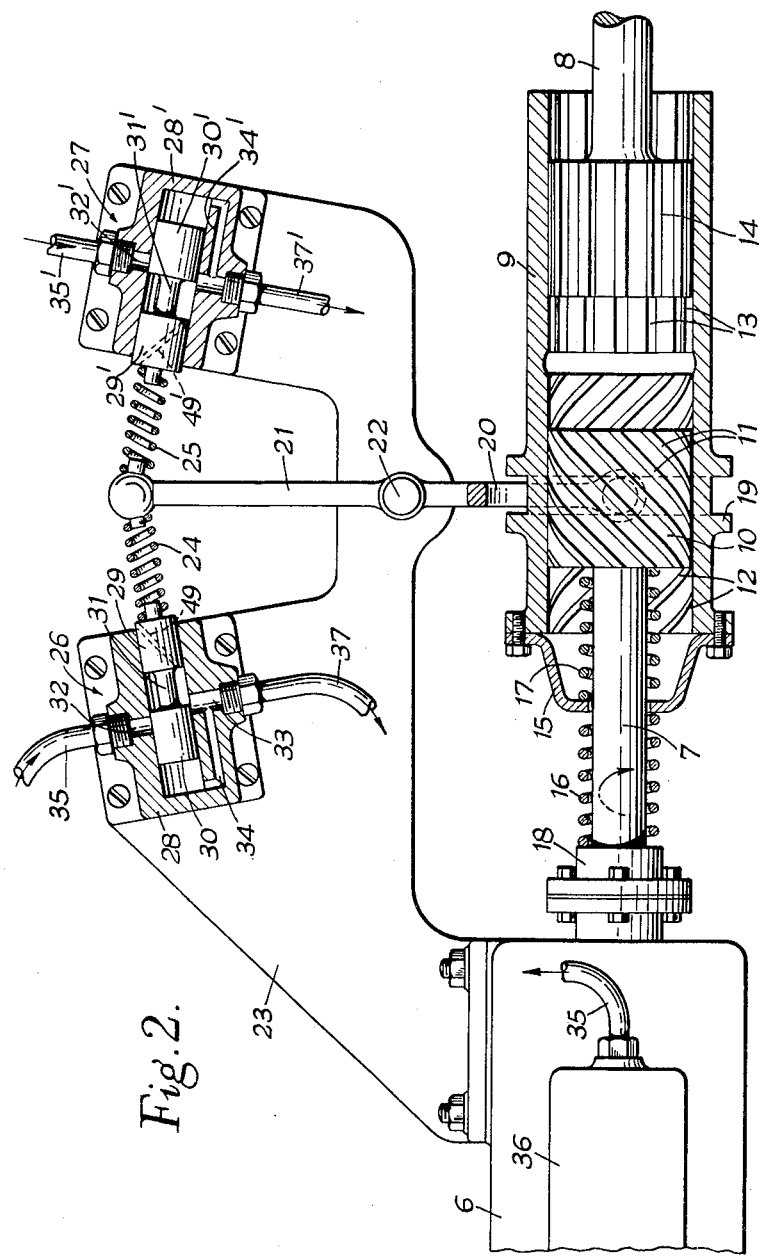

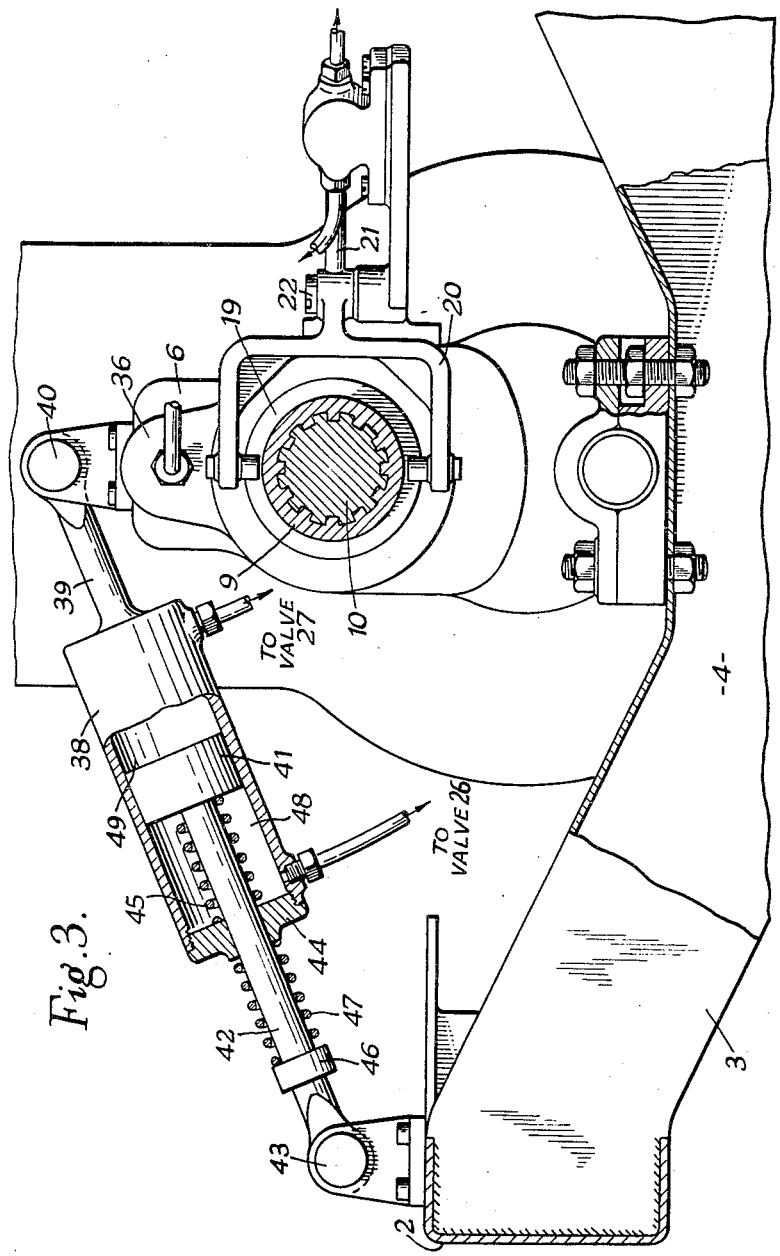

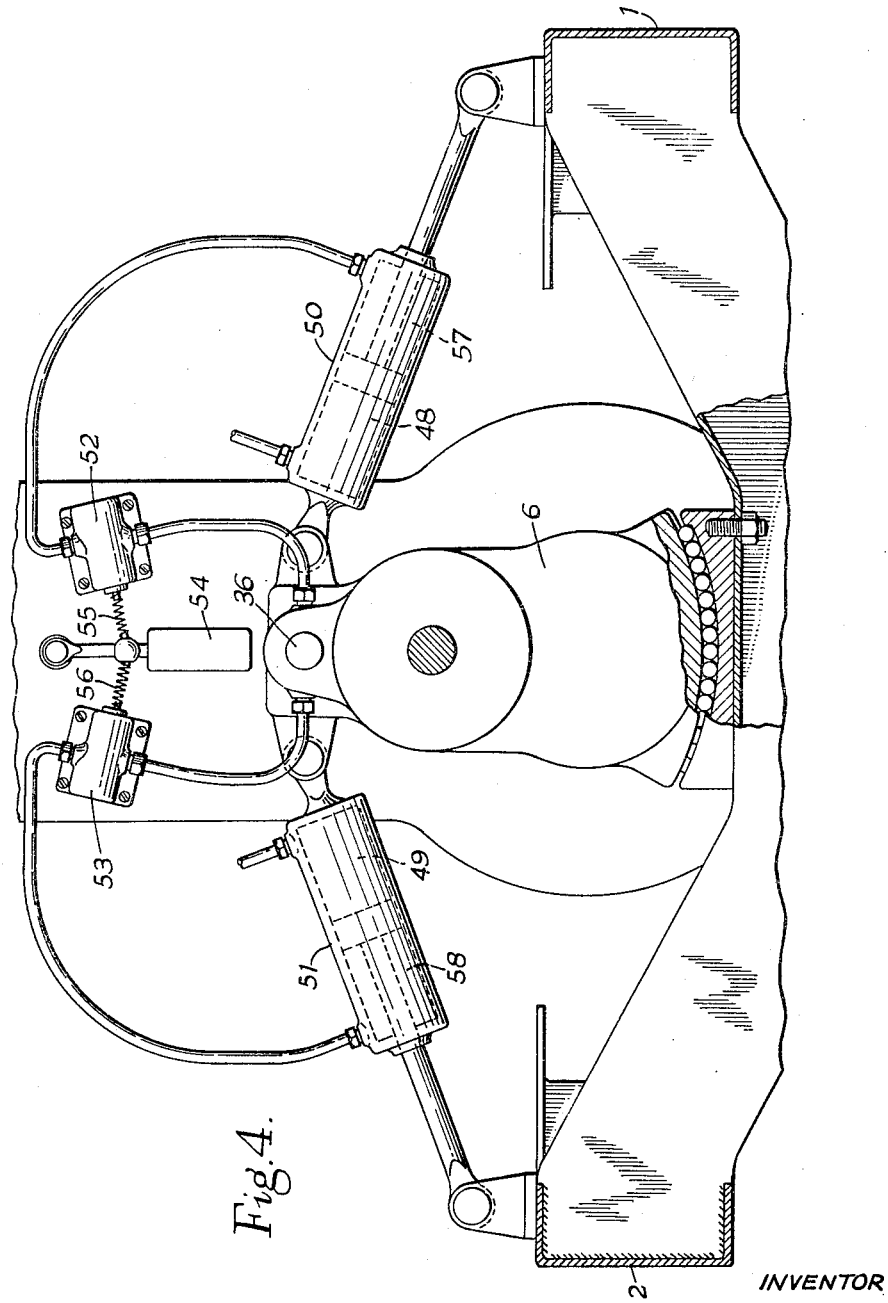

June 5, 1962  R. C. CLERK  3,037,574
VEHICLE DRIVING SYSTEMS
Original Filed Sept. 14, 1953  8 Sheets-Sheet 5
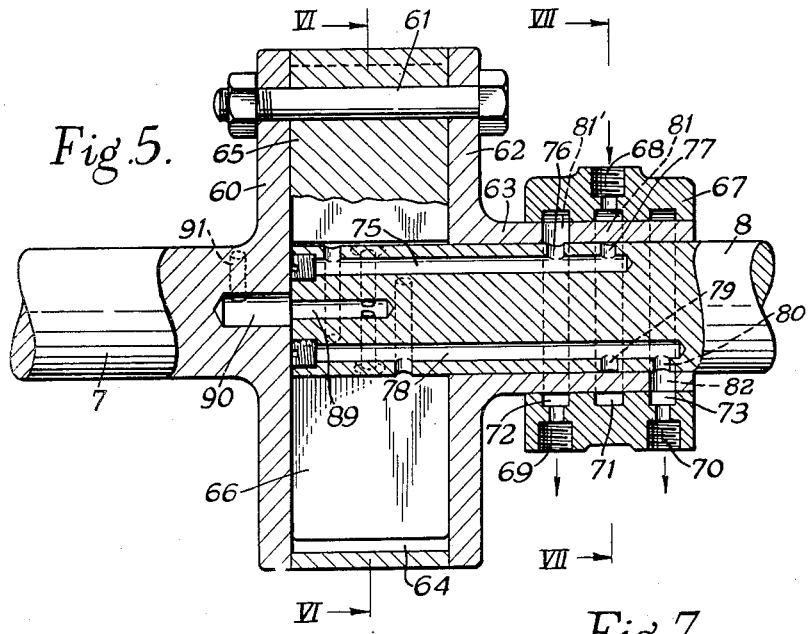
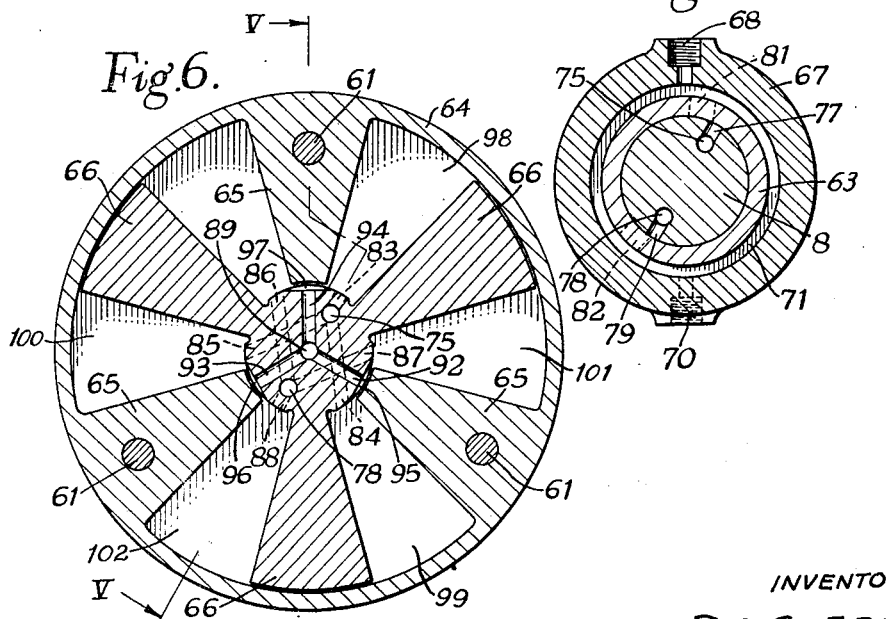
INVENTOR
R.C. CLERK
BY
Joseph H. Schofield
ATTORNEY June 5, 1962 R. C. CLERK 3,037,574
VEHICLE DRIVING SYSTEMS
Original Filed Sept. 14, 1953 8 Sheets-Sheet 6

INVENTOR
R.C. CLERK
BY
Joseph K. Schofield
ATTORNEY

June 5, 1962 R. C. CLERK 3,037,574
VEHICLE DRIVING SYSTEMS
Original Filed Sept. 14, 1953 8 Sheets-Sheet 8
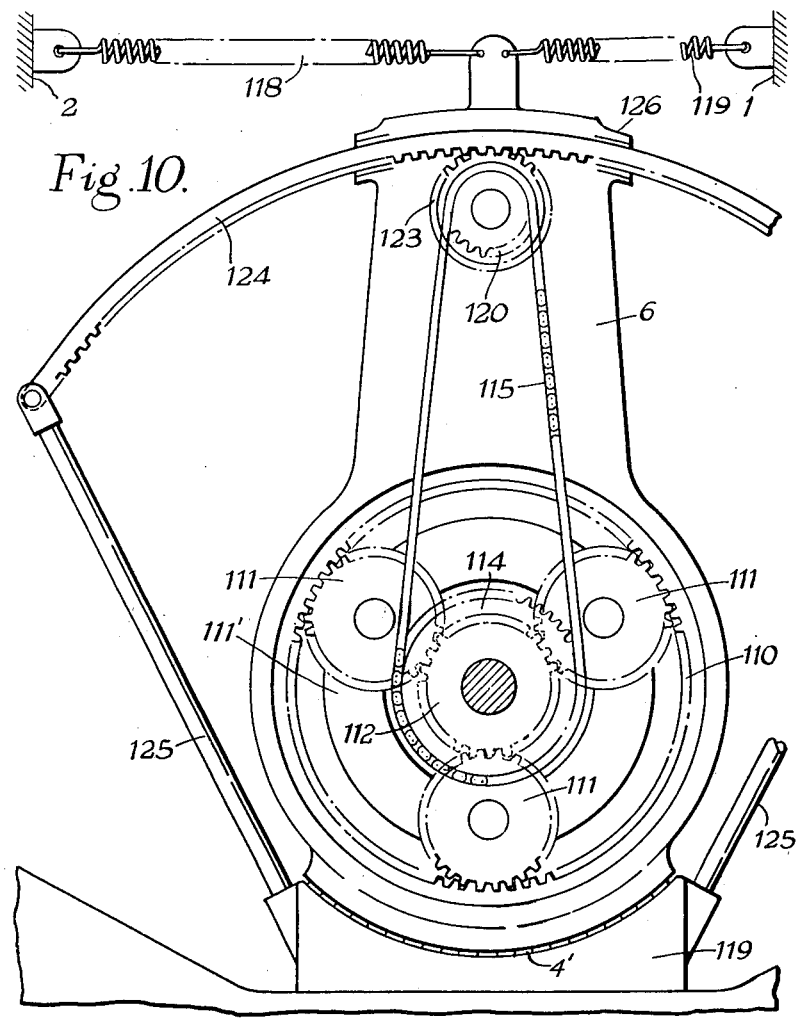
Fig. 10.
Fig. 11.
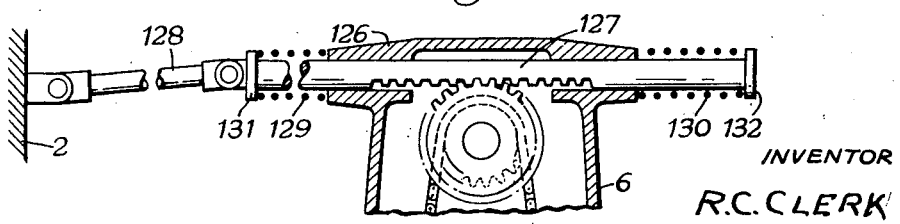
INVENTOR
R.C. CLERK
BY
Joseph H. Schofield
ATTORNEY United States Patent Office
3,037,574
Patented June 5, 1962

3,037,574
VEHICLE DRIVING SYSTEMS
Robert Cecil Clerk, Richmond, England, assignor to Gyreacta Transmission Limited, London, England
Continuation of application Ser. No. 379,856, Sept. 14, 1953. This application Jan. 9, 1959, Ser. No. 786,667
Claims priority, application Great Britain Sept. 17, 1952
9 Claims. (Cl. 180—70)

This invention relates to vehicle driving systems wherein the transmission system individually or together with the engine is mounted so as to be capable of angular movement about a fore and aft axis of the vehicle, with respect to the vehicle frame. The present application is a continuation of my co-pending application Serial No. 379,856 filed 14th September 1953 and now abandoned.

The invention relates particularly but not exclusively to vehicle driving systems of the type having a flywheel which is independent of the vehicle engine where such is provided and which is capable of storing energy which can be utilised in driving the vehicle.

A system of the last-mentioned type is disclosed in the specification of United States Patent No. 2,803,151. In the said specification there are described, with reference to FIGURE 3 of the drawings accompanying that specification, means having the purpose of enabling the gear case of the unit which incorporates the flywheel to maintain its angular position about a fore and aft axis irrespective of angular movement of the vehicle about said axis, or alternatively to permit angular movement of the gear case in response to pitching movements of the vehicle, whilst still transmitting torque reaction from the gear case to the vehicle frame. The said means have, however, been found not to be wholly satisfactory under some conditions, as the resilient mounting only provides reaction proportional to angular movement of the gear case relative to the vehicle frame. The object of the present invention is to provide improved means for applying the transmission torque reaction to the vehicle frame.

According to the invention there is provided a vehicle driving system of the type referred to in the first paragraph hereof, wherein the transmission system and the vehicle frame are interconnected by means capable of developing a tension or pressure which varies in accordance with the torque transmitted by the transmission system, whereby to exert on said unit a torque which is varied in proportion to the said transmitted torque.

With an arrangement according to the invention if the transmission system tends to move about the said axis it is able to take up any position about said axis within a predetermined range of angular movement without having to overcome or being influenced by the torque reaction of the transmission.

Where the invention is employed in a transmission system capable of applying retarding torque to a propelling shaft, as in a regenerative transmission system, for example in the system referred to as described in the above-mentioned specification, the means provided in accordance with the present invention requires to be double-acting so as to be capable of operating on one sense during driving and in the opposite sense during the application of retarding torque.

In order that the invention may be clearly understood and readily carried into effect, some embodiments thereof will now be described by way of example with reference to the accompanying drawings, in which:

FIG. 1 is a plan view of the frame of a vehicle provided with a fly-wheel transmission system and incorporating a double-acting fluid pressure ram, FIG. 2 is a part-sectional view of the means for controlling the supply of fluid to the double-acting ram of FIG. 1, FIG. 3 is a part-sectional view of the double-acting ram and associated parts of the vehicle, FIGS. 4, 5, 6 and 7 illustrate another form of fluid control means for a system employing a pair of single acting rams.

Figure 9:
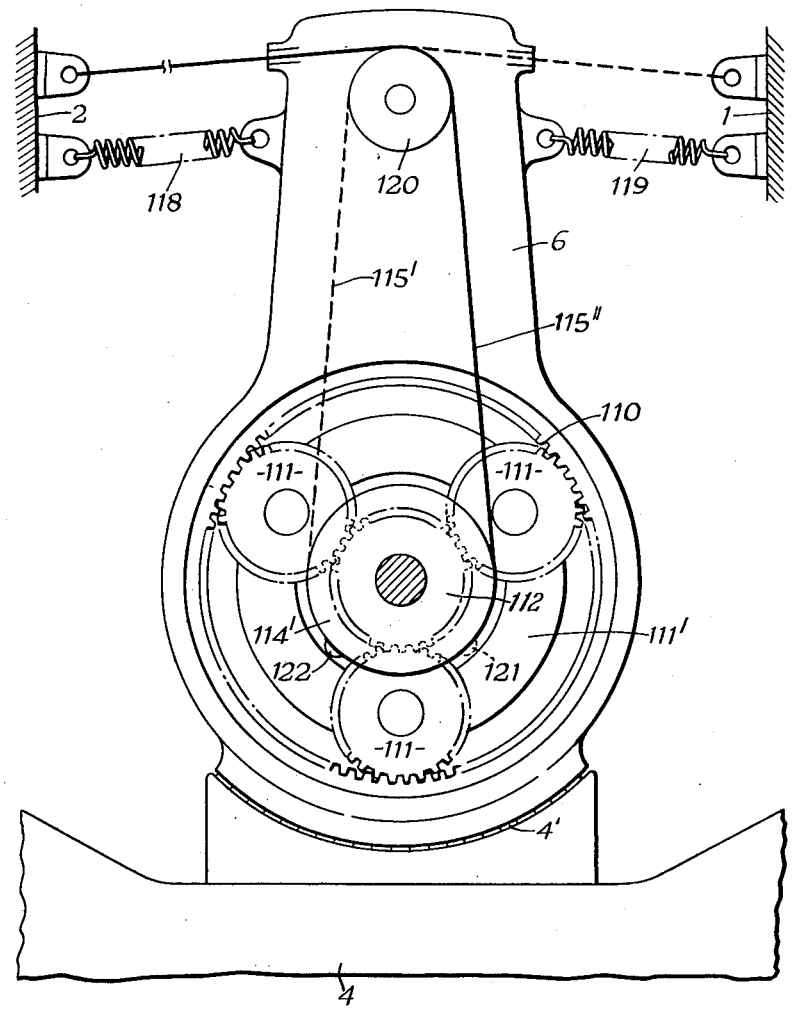

FIG. 8 illustrates an embodiment wherein a drive chain which is subject to tension proportional to the transmitted torque is employed instead of a fluid pressure ram, FIG. 9 illustrates a modification of the embodiment of FIG. 8, and FIGS. 10 and 11 illustrate further embodiments of the invention wherein said means incorporate a rack and pinion mechanism.

Referring to FIGURES 1, 2 and 3, the vehicle frame comprises side members 1 and 2, interconnected by transverse members 3 and 4, on which is mounted the transmission system having a casing 6 in unit with an engine 5. The transmission system may be of the flywheel type as referred to above, the flywheel casing being indicated by the circle in FIG. 1. The output shaft of the transmission system is in two parts, namely an intermediate shaft 7 and a shaft 8 which forms the output shaft proper and is coupled to the rear wheels of the vehicle. The intermediate shaft 7 projects into a cylindrical sleeve 9 and has an enlarged cylindrical portion 10 formed with helical splines 11 which engage with helical splines 12 on the inner surface of the sleeve 9. The latter is also formed with internal straight splines 13 which engage with external straight splines on a cylindrical enlargement 14 of the output shaft 8. A cap 15, through which the shaft 7 projects, is secured to one end of the sleeve 9, and compression springs 16 and 17 are provided respectively between the cap 15 and an abutment formed by the flange coupling 18, and between the cap 15 and the portion 10.

The sleeve 9 is formed with an annular grooved collar 19 in which engages a fork 20 on one end of a lever 21 which is pivotally mounted at 22 on a bracket 23 bolted to the casing 6 of the transmission system. The other end of the lever 21 is operatively connected via springs 24 and 25 respectively, to valves 26 and 27 which are also mounted on the bracket 23. The valves 26 and 27 are of similar construction. (FIG. 2).

The valve 26 comprises a cylinder 28 in which are longitudinally slidable two pistons 29 and 30 which are interconnected by a stem 31 of reduced diameter. Two ports 32 and 33 are provided in the side of cylinder 28, and the port 33 is connected by a duct 34 to the inner end of the cylinder 28. The port 32 is connected by a pipe 35 to the outlet of a pump 36 mounted on the casing of the transmission system. The port 33 of valve 26 is connected by a pipe 37 to one end of a cylinder 38 which has an axially projecting arm 39 which is pivotally connected at 40 to the casing 6 of the transmission system. Within the cylinder 38 is a longitudinally slidable piston 41, provided with a piston rod 42 which is pivotally connected at 43 to the side member 2 of the vehicle frame.

The valve 26 has a port 32' which corresponds to the port 32 of valve 26, and which is connected by a pipe 35' to the pump 36. It also has a port 33' which corresponds to the port 33 of valve 26 and which is connected by a pipe 37' to the end of cylinder 38 remote from the piston rod 42 (FIG. 3). The cylinder 38 is closed by an end cover 44 through which the piston rod 42 projects in fluid-tight manner. Between the piston 41 and the cover 44 is provided a helical compression spring 45, and between the cover 44 and a collar 46 on piston rod 42 is provided a helical compression spring 47.

The whole unit comprising the engine and the transmission system is journalled in bearings on the transverse frame members 3 and 4 so as to be capable of angular movement about a longitudinal axis.

The operation is as follows, assuming that the engine is supplying torque to the output shaft 8, and an equal and opposite reaction torque is transmitted to the gear case of the engine and transmission unit.

It will be assumed that the forward or driving direction of the intermediate shaft 7 is in the clockwise direction viewed from the left-hand side of FIG. 2, as indicated by the arrow. The transmission of driving torque to the shaft 8 from the shaft 7 causes the sleeve 9 to move to the right (FIG. 2) under the action of the helical splines. This movement causes compression of the spring 17, and also causes the lever 21 to move in anti-clockwise direction (FIG. 2) so as to compress the spring 24. The valve 26 is normally in the position shown, in which the supply of fluid from the pump 36 to the space 48 in cylinder 38 is cut off at port 32. The compression of the spring 24 however causes the valve piston 30 to move to the left, whereby fluid is fed to the cylinder space 48, and also via duct 34 to the end of valve cylinder 28. Movement of the sleeve 9 to the right continues until the axial force on the sleeve 9 is balanced by the pressure of spring 17 and the pressure of spring 24 increased in the ratio of the lever arms of lever 21. Spring 24 is at this stage balanced by the fluid pressure on valve piston 30, this pressure serving to close the port 32. This pressure corresponds to the pressure of the fluid which was fed to the space 48 during the time that port 32 was open.

The torque transmission to shaft 8 tends to cause the transmission system as a whole to turn in the opposite direction to the arrow of FIG. 2, i.e., in clockwise direction as seen in FIG. 3. This tendency is opposed by the fluid pressure in space 48, and the effective area of the piston 41 and the lever arm represented by the distance of the pivot 40 from the longitudinal axis of rotation of the transmission system are selected so that the force exerted on the gear case by the hydraulic ram formed by cylinder 38 and piston 41 as nearly as possible exactly balances the output driving torque.

A bleed port 49 in piston 29 ensures that normally the port 32 is always slightly open, so that fluid is fed from the pump 36 continuously without increasing the pressure in cylinder space 48.

When the balance condition has been reached as above described, there will be no tendency for the gear case to be displaced angularly unless a disturbing force acts on it. If due to gyroscopic action, or to the inertia of the moving engine masses during acceleration, the gear case tends to turn clockwise as seen in FIG. 3, the disturbing torque will tend to cause a fluid displacement from cylinder space 48. This fluid displacement is transmitted back to valve 26, where the displaced fluid is permitted to leak from space 48 via the bleed port 49, so that the gear case is enabled to turn to the position dictated by the disturbing force.

If the disturbing force tends to cause the gear case to move anti-clockwise as seen in FIG. 3, this will tend to cause the volume of space 48 to increase, whereby the fluid pressure in space 48 momentarily decreases, and this decreased fluid pressure is transmitted back to valve 26 so that the spring 24 is enabled to open the port 32. Fluid is then fed to the space 48 until the gear case has reached the angular position dictated by the disturbing force, the reaction torque remaining balanced by the pressure in space 48.

When the transmission system is providing a retarding torque, the sleeve 9 moves to the left until the axial force on it is balanced by the spring 16 plus the effective force of spring 25 due to the leverage of lever 21. In this case the torque reaction on the gear case is balanced by the force exerted on the pivot 40 due to the fluid pressure in cylinder space 49, which is controlled by valve 27, in the same way as the pressure in space 48 is controlled by the valve 26, to enable the gear case to move angularly in response to disturbing forces whilst maintaining the reaction torque balanced. The area of the piston 30' of valve 27 is larger than the area of piston 30 of valve 26, to compensate for the greater area of that face of piston 41 which is unencumbered by piston rod 42.

In the arrangement so far described, the cylinder 38 and piston 41 form a double-acting ram the two sides of which serve to balance the torque reaction for driving torque and retarding torque respectively. This double-acting ram may clearly be replaced by two single acting rams which for example connect the gear case to the respective sides of the vehicle frame.

In the above-described arrangement the springs 45 and 47 are provided to return the gear case to an upright position when the disturbing force has ceased. These springs, however, tend to align the gear case with the vehicle when the latter is parked in a tilted position, which in the case of a flywheel transmission may be a disadvantage.

In FIGS. 4 to 7 which show the employment of two single-acting rams in place of the double-acting ram previously described, springs corresponding to springs 45 and 47 are omitted, and in their place a damped gravity valve device is employed which by supplying fluid appropriately to the two rams tends to bring the gear case to an upright position when the vehicle is parked in a tilted position, and also, in the case of a flywheel transmission, opposes any tendency for the gear case to turn due to the effect on the flywheel of the rotation of the earth.

In the arrangement of FIG. 4, two single acting rams 50 and 51 connect the gear case to the side frame members 1 and 2 respectively. The ram 50 controls the position of the gear case during the transmission of driving torque, for which purpose fluid is fed to and released from the cylinder space 48 as necessary, and the ram 51 controls the position of the gear case during the transmission of retarding torque, for which purpose fluid is fed to and released from the cylinder space 49 as necessary. The means for controlling the fluid in the spaces 48 and 49 may be similar to the means employed in the arrangement of FIGS. 1 to 3. In addition to the said means, two valves 52 and 53 are provided which are under the control of a pendulum 54 through the medium of springs 55 and 56. When the gear case tilts to the right, the valve 52 is operated through spring 55 to supply fluid to the cylinder space 57 of ram 50. When the gear case tilts to the left, the valve 53 is operated through spring 56 to supply fluid to the cylinder space 58 of ram 51, and at the same time the spring 55 operates valve 52 to release fluid from space 50. The effect is that the gear case will always tend to be aligned vertically, if the gyroscopic effect of the flywheel due to the earth's rotation should tend to tilt the transmission system, or if the vehicle should be parked in a tilted position.

In the embodiment of the invention illustrated in FIGURES 5, 6 and 7, the output shaft comprises an intermediate shaft 7 which is coupled to the output element of the flywheel unit, and an output shaft proper 8. The shaft 7 is formed with a flange 60 which is coupled by bolts 61 to a flange 62 formed on a sleeve 63 which is angularly movable on shaft 8. Between the flanges 60 and 62 is clamped a ring 64, which carries three uniformly spaced vanes 65 which project radially inwardly towards and stop just short of the shaft 8, and the shaft 8 carries three uniformly spaced vanes 66 which project radially outwardly and stop just short of the ring 64, so as to permit only a restricted leakage of fluid from one inter-vane space to the next.

Around the sleeve 63 is provided a stationary collar 67, which is formed with a port 68 which communicates by a pipe (not shown) with a pump provided on the gear casing as in the embodiments already described, and which is also formed with ports 69 and 70 which communicate respectively with the spaces 48, 49 of the single-acting rams 50, 51 of FIG. 4. The port 68 communicates with an annular groove 71 in collar 67, which is also formed with annular grooves 72 and 73. The groove 72 communicates with port 69, and the groove 73 communicates with port 70.

The shaft 8 is formed with a longitudinal duct 75 which communicates with ports 76 and 77 in the shaft 8, and with a longitudinal duct 78 which communicates with ports 79 and 80 in the shaft. The sleeve 63 is formed with ports 81, 81' and 82.

The duct 75 communicates with three ports 83, 84 and 85 which are formed in shaft 8 and which open respectively into the spaces between each vane 65 and the next vane 66 considered in clockwise sense, FIG. 6. The duct 78 communicates with three ports 86, 87 and 88 which open respectively into the spaces between each vane 66 and the next vane 65 in clockwise sense, FIG. 6. A further longitudinal duct 89 in shaft 8 communicates with a duct 90 and bleed port 91 in shaft 7, and with three ports 92, 93 and 94 which communicate respectively with channels 95, 96 and 97 which serve to connect the respective pairs of intervane spaces when the parts are in the positions shown.

In operation, when no driving torque is being transmitted, fluid fed by the pump passes through port 68 into the annular groove 71. As shown in FIG. 7, the ports 81 and 82 have restricted communication with the ports 77 and 79 respectively, so that fluid passes into the ducts 75 and 78 and thence to each of the inter-vane spaces, from which the fluid bleeds via the channels 95, 96 and 97 and ducts 90 and 91.

When driving torque is transmitted from shaft 7 to shaft 8, and assuming that the driving direction of shaft 7 is clockwise, FIGS. 6 and 7, shaft 7 moves angularly with respect to shaft 8. The consequent movement of sleeve 63 relative to shaft 8 cuts off the restricted communication between ports 79 and 82, and increases the communication between ports 77 and 81. Also, the movement of the ring 64 relative to shaft 8 causes the vanes 65 to move relatively to the vanes 66 so that the inner ends of vanes 65 partially close the channels 95, 96 and 97 off from the intervane spaces 98, 99 and 100, and the pressure in these spaces, which transmits the torque from shaft 7 to shaft 8, builds up due to the feeding of fluid thereto via duct 75, and fluid is fed at this pressure through ports 76 and 81', annular groove 72 and port 69 to the space 48 of ram 50 (FIG. 4) until the reaction torque on the gear case is balanced. If now a disturbing force tends to cause the gear case to move in one direction the fluid displacement from the ram is transferred to the spaces 98, 99, 100 and causes relative movement of the vanes 65 and 66 so as to open a greater area of the channels 95, 96, 97 to these spaces so that fluid flows from them via ducts 87, 90 and 91. If the disturbing force tends to cause movement of the gear case in the other direction, the relative movement of sleeve 63 and shaft 8 opens port 75 to port 81 so that further fluid is fed to the space 48 of ram 50 via ports 76, 81', groove 72 and port 69. The quantity of fluid in the space 48 of the ram 50 therefore alters in the appropriate sense, without change of pressure, to enable the gear case to take up the position dictated by the disturbing force.

In the case of the transmission of retarding torque to shaft 8, fluid is fed to the duct 78, and to the space 49 of ram 51 via port 70, and to the intervane spaces 101, 102 and 103, and the accommodation of the system to disturbing forces is exactly similar to the series of operations above described for the case of driving torque.

In the embodiment of the invention shown in FIG. 8, a propeller shaft driving member in the form of an annulus gear 110, drivably connected to the propeller shaft of the vehicle, meshes with planet pinions 111 on a planet carrier 111' coupled to the output shaft 7 of the transmission system. A sun gear 112, carried on a sleeve 113 surrounding the shaft 7, is in mesh with the planet pinions 111. The sleeve 113 carries a sprocket 114, around the lower portion of which passes a drive chain 115 which also passes over idler sprockets 116 and 117 journalled on the gear case 6 and has its ends anchored to the side members 1 and 2 of the vehicle frame. Light centering tension springs 118 and 119 connect the gear case 6 to the side frame members.

During the transmission of driving torque the planet carrier 111' rotates in anti-clockwise direction, and transmits torque to the annulus gear 110, and a proportional reaction torque to the sun gear 112, also in anti-clockwise direction. The part A of the chain 115 imposes on the gear case 6 a tensional force which acts at a distance from the axis 118 about which the gear case 6 is angularly movable in the cradle 119 by virtue of the bearing 4', such that the moment of this force balances the torque reaction imposed on the gear case by the propeller shaft, irrespective of angular movements of the gear case 6 about axis 118 in response to disturbing forces.

During the transmission of retarding torque, the part B of the chain 115 is effective in balancing the torque reaction on the gear case.

The arrangement of FIG. 8 is suitable where the planetary gearing provides an increased speed ratio as between the output member of the transmission system and the propeller shaft. FIG. 9 differs from FIG. 8 in that the output element from the transmission system is the annulus gear 110, and a reduced speed ratio is provided as between the annulus gear 110 and the planet carrier 111', which is coupled to the propeller shaft. In this case, two flexible tension members 115' and 115'' are anchored respectively to the frame members 1 and 2, and pass over coaxial pulley wheels 120, and are anchored to a drum 114' on the sun sleeve 113 at 121 and 122 respectively. If desired, instead of the two flexible tension members 115' and 115'', a single continuous tension member similar to that of the previous example may be employed, the coaxial pulley wheels being replaced by a duplex sprocket in association with a sun sleeve sprocket.

FIG. 10 shows an embodiment of the invention with planetary gearing arranged as in FIG. 9, and with a chain 115 which passes in a closed loop over a sprocket 120 on the casing 6 of the power transmission unit and a sprocket 114 drivably connected to sun gear 112. Sprocket 120 is drivably coupled to a pinion 123 which cooperates with a curved rack 124 which is linked by arms 125 to a cradle 119 on which the casing 6 is supported through a bearing 4' permitting angular movement of casing 6, the rack 124 projecting from an arcuate guide 126 at the upper part of the casing 6. Centering tension spring 118 and 119 are provided between the casing 6 and the side frame members 2 and 1 of the vehicle.

FIG. 11 illustrates a modification of FIG. 10 wherein the curved rack of FIG. 10 is replaced by a straight rack 127 which projects through a straight guide 126 and is anchored by a link 128 to the side frame member 2. Centering compression springs 129 and 130 are provided between the guide 126 and collars 131 and 132 on the rack 127. Such an arrangement is suitable for use where the angular movements of the gear case are likely to be small.

I claim:

1. A power driven vehicle comprising a vehicle frame, a power transmission unit capable of transmitting torque about an axis, a casing for said power transmission unit, means supporting said casing on said frame and permitting a predetermined range of angular movement of said casing about said axis, reaction-balancing means for exerting on said casing a moment that varies in accordance with and substantially balances the reaction on said casing due to torque transmitted by said unit, and torque-sensing means, means operatively connecting said torque-sensing means to said reaction-balancing means to control the moment exerted by said reaction-balancing means, said torque-sensing means being responsive solely to the torque transmitted by said unit whereby the control exerted by said torque-sensing means on said reaction-balancing means is independent of the angular position, within said predetermined range, of said casing relative to said frame.

2. A vehicle as set forth in claim 1 wherein said moment-exerting means comprise at least one fluid pressure ram for balancing driving torque transmitted by said unit, the pressure in said ram being under the control of said torque-sensing means, the vehicle including also means for varying the quantity of fluid in said ram in response to angular movements of said casing about said axis whereby to maintain said driving torque substantially balanced irrespective of the angular position, within said range, of said casing relative to said frame.

3. A vehicle as set forth in claim 2, wherein said moment-exerting means comprise at least one further pressure ram for balancing retarding torque transmitted by said unit, the pressure in said ram being under the control of said torque-sensing means, the vehicle also including means for varying the quantity of fluid in said ram in response to angular movements of said casing about said axis whereby to maintain said retarding torque substantially balanced irrespective of the angular position, within said range, of said casing relative to said frame.

4. A vehicle as set forth in claim 3, wherein said rams for balancing driving and retarding torque respectively are formed by a single double-acting ram.

5. A power driven vehicle comprising a vehicle frame, a power transmission unit capable of transmitting torque about an axis, an output shaft for said unit, a casing for said power transmission unit, means supporting said casing on said frame and permitting angular movement of said casing about said axis, planetary gearing comprising three elements namely an annulus gear, a sun gear, and a planet carrier, one of said elements being a propeller shaft driving member, another of said elements being drivably coupled to said output shaft, a pulley wheel drivably coupled to the third of said elements, first and second pulleys carried by said casing, and a flexible tension member which extends around said pulley wheel and the ends of which pass over the respective ones of said pulleys and are anchored to said vehicle frame at points such that said tension member is capable of exerting a moment on said casing via said first pulley, due to tension in said tension member, arising from driving torque transmitted via said output shaft, to substantially balance reaction on said casing due to said driving torque, and such that said tension member is capable of exerting a moment on said casing via said second pulley due to tension in said tension member arising from retarding torque transmitted via said output shaft, to substantially balance reaction on said casing due to said retarding torque.

6. A power vehicle comprising a vehicle frame, a power transmission unit capable of transmitting torque about an axis, a propeller shaft, a casing for said power transmission unit, means supporting said casing on said frame and permitting angular movement of said casing about said axis, planetary gearing comprising three elements namely an annulus gear, a sun gear and a planet carrier, an output shaft for said power transmission unit, one of said elements being drivably coupled to transmission unit, another of said elements being drivably coupled to said propeller shaft, a rack disposed transversely with respect to said axis and fixed to said frame, a pinion mounted on said casing in toothed engagement with said rack, a wheel drivably coupled to said third element of the planetary gearing, and a flexible tension member forming a driving belt connection between said wheel and said pinion.

7. A vehicle as set forth in claim 6 wherein said rack is of arcuate form with its centre of curvature on the said axis about which said power transmission unit is capable of transmitting torque.

8. A vehicle as set forth in claim 1, including means for biasing the said power transmission unit to an upright position.

9. A vehicle as set forth in claim 1, including fluid pressure operated means connected between said power transmission unit and the vehicle frame for biasing said transmission unit to an upright position, and pendulum controlled valve means for controlling the feeding of fluid to said fluid pressure controlled means.

References Cited in the file of this patent
UNITED STATES PATENTS

| | | |
|---|---|---|
| 1,522,243 | Hughes | Jan. 6, 1925 |
| 1,864,348 | Given | June 21, 1932 |
| 2,062,804 | Braga | Dec. 1, 1936 |
| 2,161,008 | Bonn | June 6, 1939 |
| 2,527,658 | Sinclair | Oct. 31, 1950 |
| 2,670,201 | Rossman | Feb. 23, 1954 |
| 2,803,151 | Clerk | Aug. 20, 1957 |
| 2,844,052 | Stoeckicht | July 22, 1958 |
| 2,893,247 | Stern et al. | July 7, 1959 |

UNITED STATES PATENT OFFICE

CERTIFICATE OF CORRECTION

Patent No. 3,037,574                                              June 5, 1962

Robert Cecil Clerk

It is hereby certified that error appears in the above numbered patent requiring correction and that the said Letters Patent should read as corrected below.

In the grant, lines 2 and 11, and in the heading to the printed specification, line 4, name of assignee, for "Gyreacta Transmission Limited", each occurrence, read -- Gyreacta Transmissions Limited --.

Signed and sealed this 11th day of December 1962.

(SEAL)
Attest:

ERNEST W. SWIDER                                        DAVID L. LADD
Attesting Officer                                          Commissioner of Patents